United States Patent
Wang

(10) Patent No.: US 6,736,418 B2
(45) Date of Patent: May 18, 2004

(54) VEHICLE WHEEL END HAVING INTEGRATED KNUCKLE AND OUTER RACE

(75) Inventor: Hui Wang, Ann Arbor, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 102 days.

(21) Appl. No.: 10/153,992

(22) Filed: May 23, 2002

(65) Prior Publication Data

US 2003/0218309 A1 Nov. 27, 2003

(51) Int. Cl.$^7$ ................................................. B62D 7/18
(52) U.S. Cl. ............................... 280/93.512; 280/93.51; 180/400
(58) Field of Search ................................. 280/93.512, 93.51, 280/93.502; 180/400, 259

(56) References Cited

U.S. PATENT DOCUMENTS

| | | | |
|---|---|---|---|
| 846,908 A | 3/1907 | Cooper | 180/259 |
| 1,269,004 A | 6/1918 | Rowley | 180/259 |
| 1,408,266 A | 2/1922 | Campbell | 180/259 |
| 1,623,845 A | 4/1927 | Kogstrom | 180/259 |
| 3,937,535 A | 2/1976 | Ladin | 308/191 |
| 3,940,194 A | 2/1976 | Asberg | 308/236 |
| 3,944,011 A | 3/1976 | Ernst et al. | 180/70 R |
| 4,203,635 A | 5/1980 | Reiter | 308/212 |
| 4,352,528 A | 10/1982 | Guimbretiere | 308/189 R |
| 4,466,503 A | 8/1984 | Hans et al. | 180/259 |
| 5,458,352 A | 10/1995 | Lederman | 280/96.1 |
| 5,507,094 A | 4/1996 | Lederman | 29/898.061 |
| 5,702,162 A | 12/1997 | Pressler | 301/105.1 |
| 5,868,409 A * | 2/1999 | Breuer | 280/93.512 |
| 6,138,357 A * | 10/2000 | Jones | 29/897.2 |
| 2003/0146591 A1 * | 8/2003 | Ouchi et al. | 280/93.512 |
| 2003/0151223 A1 * | 8/2003 | Ozawa et al. | 280/93.512 |

* cited by examiner

Primary Examiner—J. Woodrow Eldred
(74) Attorney, Agent, or Firm—Brinks Hofer Gilson & Lione

(57) ABSTRACT

The present invention involves a bearing assembly of a wheel end for a motor vehicle. The bearing assembly includes a steering knuckle which includes an integrated outer race with inboard and outboard raceways formed thereon. The steering knuckle includes a body having an inner wall formed therethrough to define a center bore of the body. The inner wall includes an inboard outer raceway and an outboard outer raceway formed thereon, thereby eliminating the use of a separate outer race. In one embodiment, the bearing assembly includes a hub including a flange and a hub shaft having inboard and outboard ends. The flange extends from the hub shaft at the outboard end. The hub shaft is disposed in the center bore of the knuckle at the inboard end. The hub shaft has a first raceway formed thereon adjacent the outboard end of the hub shaft. The first raceway is configured to cooperate with the outboard outer raceway of the steering knuckle to house bearings. The hub shaft of the hub includes a stepped boss formed thereon adjacent the inboard side of the hub shaft. The bearing assembly further includes an inner race disposed in the stepped boss and having a second raceway formed thereon adjacent the inboard end of the hub shaft. The second raceway is configured to cooperate with the inboard outer raceway of the steering knuckle to house bearings.

21 Claims, 10 Drawing Sheets

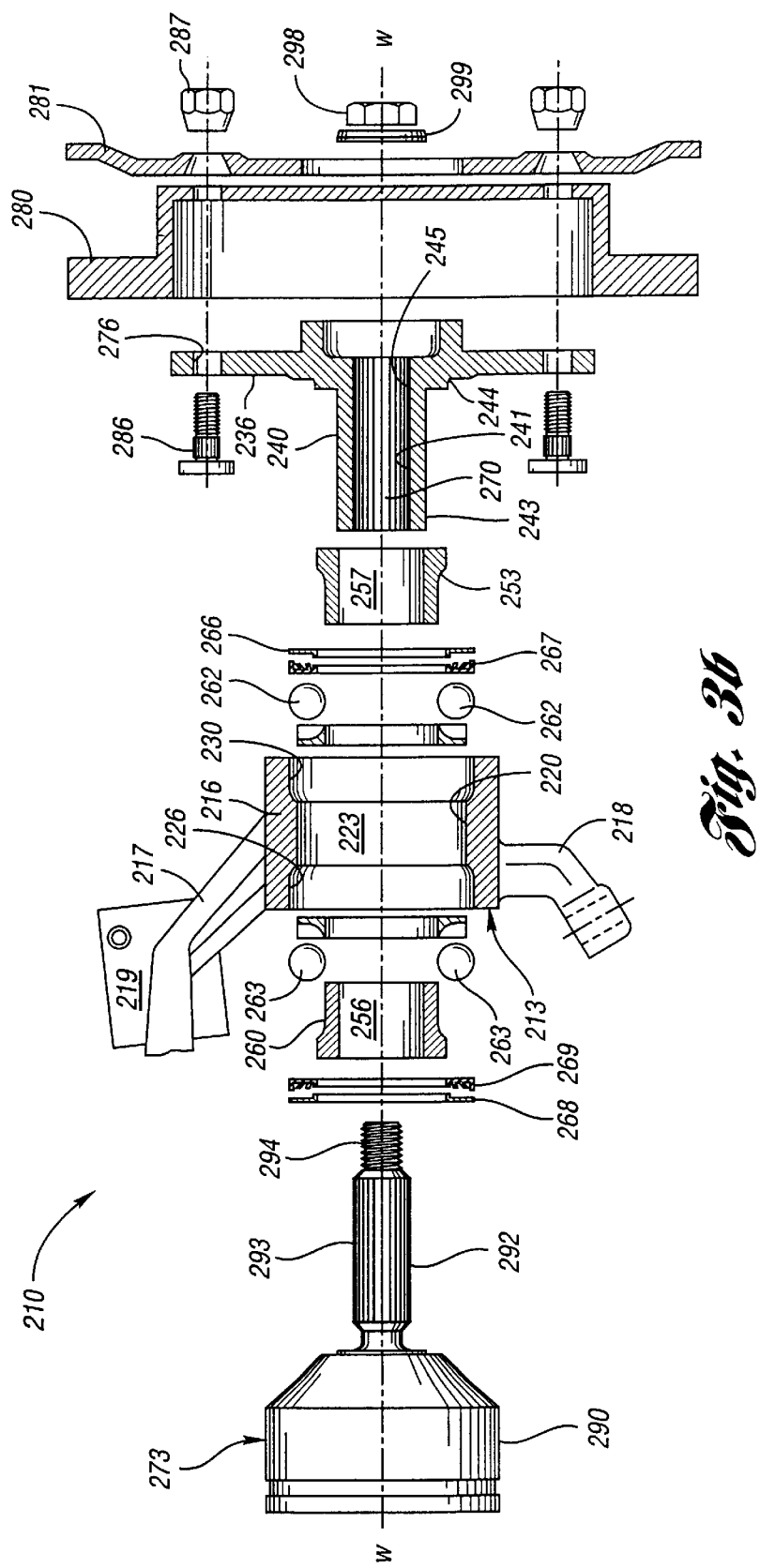

_US 6,736,418 B2_

VEHICLE WHEEL END HAVING INTEGRATED KNUCKLE AND OUTER RACE

BACKGROUND OF THE INVENTION

The present invention is related to bearing assemblies of a wheel end for a motor vehicle.

Wheel ends and bearing assemblies for motor vehicles are known and have been widely used in the automotive industry for many years. A typical wheel end of a vehicle includes a bearing assembly which is mounted to a steering knuckle by means of fasteners or interference fittings. For example, a bearing assembly may include an inner race having raceways formed thereon and an outer race having raceways formed thereon wherein the inner and outer races cooperate with each other to house ball bearings within the raceways.

Although current bearing assembly designs are adequate, bearing assembly and wheel end manufacturers have been challenged in with weight, mass, deflection, corrosion, and packaging issues. For example, many of the current designs of bearing assemblies include a relatively high weight and mass requirement. Many bearing assemblies include a mounting flange and relevant fasteners associated therewith to mount the bearing assembly to the steering knuckle. Such components add to the weight, mass, and packaging complexity of the bearing assembly. Moreover, a typical outer race and steering knuckle interface creates a deflection. Such deflection may cause brake roughness and vehicle cornering issues during normal operation of the vehicle. Moreover, for strength and stiffness, the bearings or outer races of the bearings typically are made of adequate material such as steel.

BRIEF SUMMARY OF THE INVENTION

Thus, it is one aspect of the present invention to provide a bearing assembly of a wheel end for a motor vehicle wherein the bearing assembly reduces the typical weight of the wheel end, lessens the packaging complexity, and lessens the deflection at a bearing-to-knuckle mounting interface.

It is another aspect of the present invention to provide a bearing assembly of a wheel end for a motor vehicle. The bearing assembly includes a steering knuckle having an inner wall formed through its body to define a center bore. The inner wall includes inboard and outboard outer raceways integrally formed thereon. The inboard and outboard outer raceways formed on the inner wall essentially eliminates a need for an outer race which would otherwise engage with the knuckle creating an additional interface for increased deflection, weight, and package size. Thus, the steering knuckle includes an integrated outer race having inboard and outboard outer raceways formed thereon.

In one embodiment, the bearing assembly includes a hub including a flange and a hub shaft. The flange extends from the hub shaft at the outboard end and the hub shaft is disposed in the center bore of the knuckle at the inboard end. The hub shaft has a first raceway formed thereon adjacent the outboard end of the hub shaft. The first raceway is configured to cooperate with the outboard outer raceway of the steering knuckle to house rolling elements to constitute a first bearing. The shaft of the hub further includes a stepped boss formed thereon adjacent the inboard end of the hub shaft. The bearing assembly further comprises an inner race disposed in the stepped boss wherein the inner race has a second raceway formed thereon adjacent the inboard end of the hub shaft. The second raceway is configured to cooperate with the inboard outer raceway of the steering knuckle to house rolling elements to constitute a second bearing.

In another embodiment, first and second inner races are disposed on an outer surface of the hub shaft. The first inner race has a first raceway formed thereon adjacent the outboard end of the hub shaft and configured to cooperate with the outboard outer raceway of the steering knuckle to house rolling elements to constitute a first bearing. The second inner race has a second raceway formed thereon adjacent the inboard end of the hub shaft and configured to cooperate with the inboard outer raceway of the steering knuckle to house rolling elements to constitute a second bearing.

In yet another embodiment of the present invention, the bearing assembly houses tapered rollers. In this embodiment, the inner wall of the steering knuckle includes inboard and outboard raceways configured to receive tapered bearing rollers. The hub shaft has a first raceway formed thereon adjacent the outboard end of the hub shaft. The first raceway is configured to cooperate with the outboard outer raceway of the steering knuckle to receive tapered rollers to constitute a first bearing. The hub shaft includes a stepped boss formed thereon adjacent the inboard end. The inner race is disposed in the stepped boss and has a second raceway formed thereon to receive tapered rollers to constitute a second bearing, cooperates with the inboard outer raceway of the inner wall of the steering knuckle.

Further objects, features and advantages of the invention will become apparent from consideration of the following description and the appended claims when taken in connection with the accompanying drawings.

BRIEF DESCRIPTION OF THE DRAWINGS

FIG. 3*b* is an exploded view of the bearing assembly in FIG. 3*a;*

FIG. 5b is an exploded view of the bearing assembly in FIG. 5a; and

DETAILED DESCRIPTION OF THE INVENTION

Figure 1A:
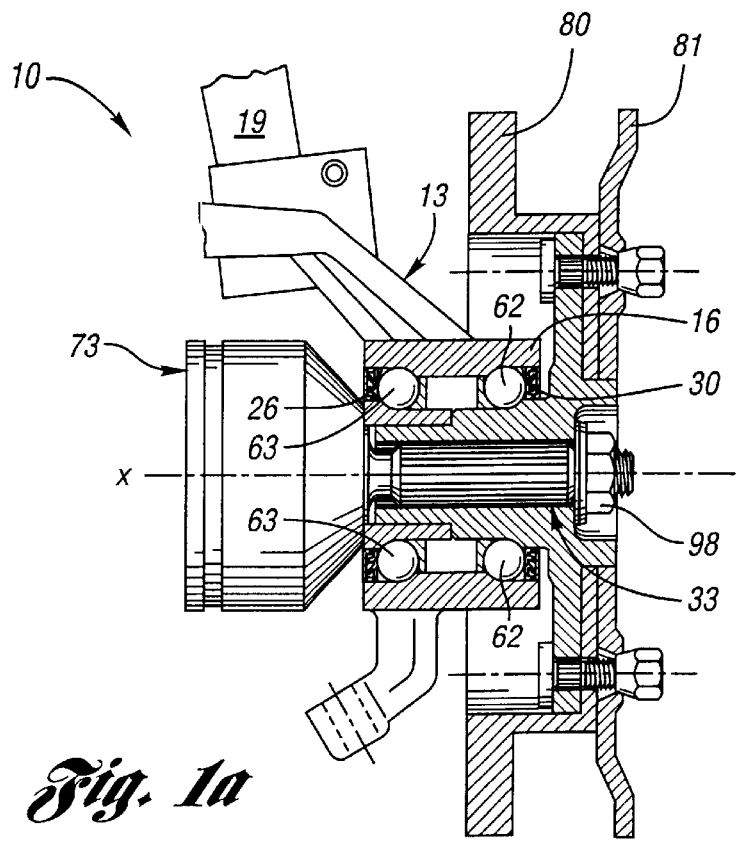
FIG. 1*a* is a cross-sectional view of a first embodiment of a bearing assembly for a driven wheel end in accordance with the present invention.
Figure 1C:
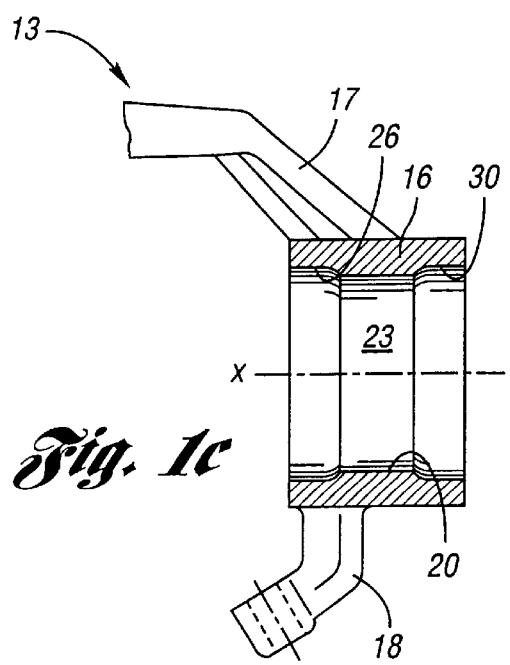
FIG. 1*c* is a cross-sectional view of a steering knuckle depicted in FIGS. 1*a* and 1*b* in accordance with the present invention.
Figure 1B:
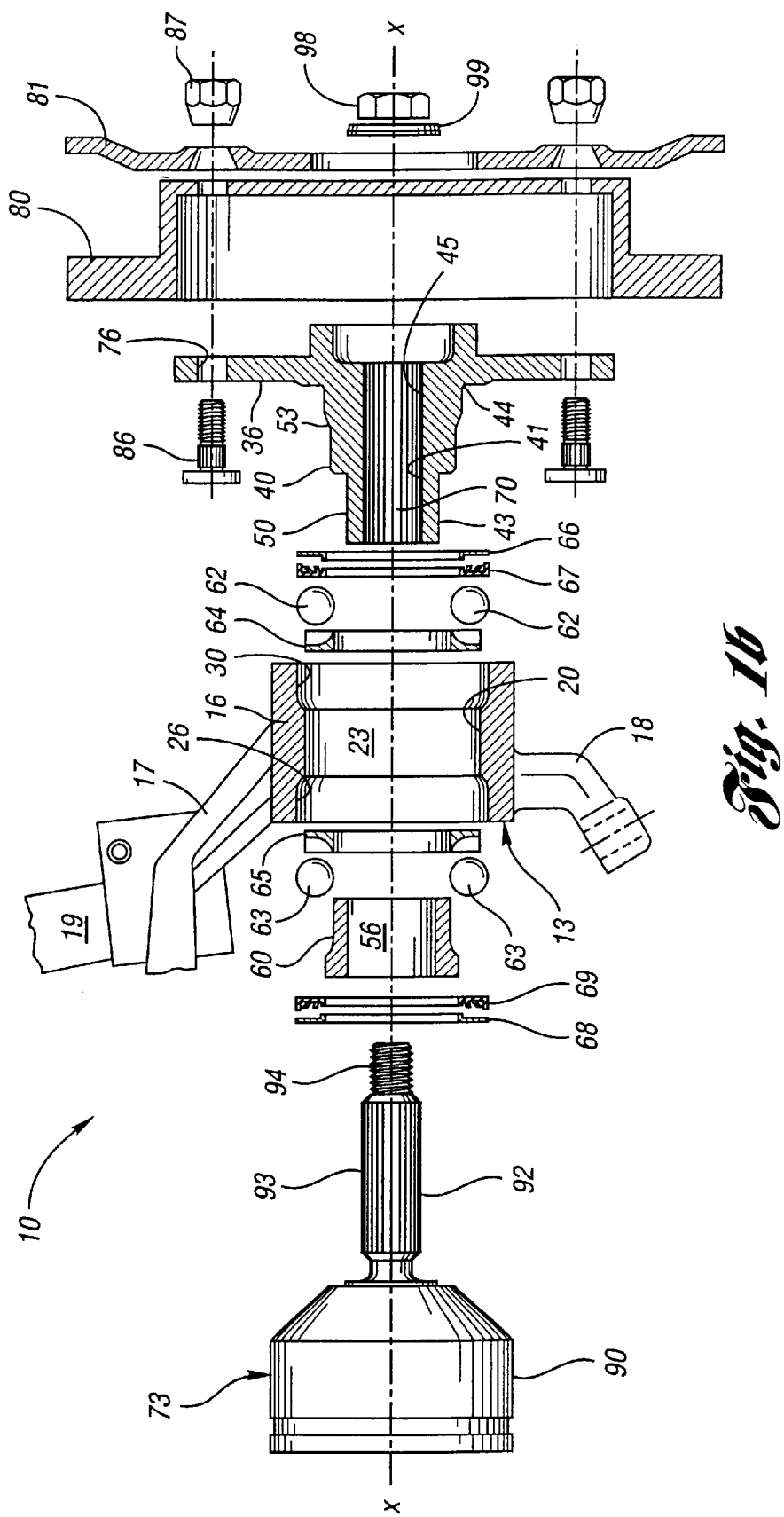
FIG. 1*b* is an exploded view of the bearing assembly in FIG. 1*a;*

FIGS. 1a–1c illustrate a first embodiment of a bearing assembly 10 of a driven wheel end for a motor vehicle in accordance with the present invention. The driven wheel end may be for a front wheel drive vehicle, a rear wheel driver vehicle or an all wheel drive vehicle. As shown, a steering knuckle 13 includes a body 16 and first and second knuckle arms 17, 18 extending from the body 16. The first and second knuckle arms 17, 18 are mounted to a strut or an upper control arm 19a and a low control arm 19b, respectively, of the motor vehicle. The body 16 includes an inner wall 20 formed therethrough to define a center bore 23 of the body. In this embodiment, the inner wall 20 has an inboard outer raceway 26 and an outboard outer raceway 30 radially formed thereon and substantially parallel with each other. In this embodiment, inboard is termed a location toward the vehicle and outboard is termed a location away from the vehicle.

The inner wall of the body replaces an outer ring or race of a conventional bearing assembly of a wheel end for a motor vehicle. An outer race would otherwise be required, creating an additional interface between the knuckle and the wheel.

As shown, bearing assembly 10 further includes a hub 33 which includes a flange 36 and a hub shaft 40 extending from the flange 36. The hub shaft 40 includes an inboard end 43 and an outboard end 44 as shown. Hub shaft 40 further includes a stepped boss 50 formed adjacent the inboard end 43 thereof. Hub shaft 40 is disposed in center bore 23 at the inboard end 43 as shown. In this embodiment, a first raceway 53 is radially formed on hub shaft 40 adjacent the outboard end 44 of the hub shaft 40.

Bearing assembly 10 further includes inner race or ring 56 which is disposed in stepped boss 50 and has a second raceway 60 formed thereon. In this embodiment, second raceway 60 is radially formed on the inner race 56 such that in operation the second raceway 60 is substantially parallel to the first raceway 53. The first raceway 53 is configured to cooperate with the outboard outer raceway 30 of the steering knuckle to house balls 62 and cage 64 therein. The second raceway 60 is configured to cooperate with the inboard outer raceway 26 of the steering knuckle to house balls 63 and cage 65 therein.

As shown, outboard and inboard seals 67 and 69 are mounted at the outboard and inboard bore ends of steering knuckle 23, respectively. Outboard and inboard slingers 66 and 68 are mounted at the outboard end 44 and inner race 56, respectively. Seals 67, 69 allow grease or lubricant to be contained within the races and provide protection from external contamination.

Hub shaft 40 further includes an internal wall 41 formed therethrough having an internal spline 45 and defining a center hole 70 formed therethrough for receiving a half shaft 73 as described below. Flange 36 has apertures 76 formed thereon to attach a rotor or drum 80 thereto for mounting a wheel 81 onto the bearing assembly 10. As shown, this is accomplished by mounting a plurality of wheel studs 86 and nuts 87 in apertures 76.

Half shaft 73 includes a bell 90 and a stem 92 extending therefrom. Stem 92 has an outer surface having an external spline 93 to be received in center hole 70 of hub shaft 40. As shown, stem 92 is received in center hole 70 wherein the internal wall 41 of hub shaft 40 is configured to cooperate with the external spline 93 of stem 92 as known in the art to allow rotation of rotor 80 and wheel 81 about axis x. The spline 93 is in mating relationship with hub 33, as known in the art. Stem 92 has a threaded end 94 so that it may be axially secured within center hole 70 by center nut 98 and washer 99.

Figure 2A:
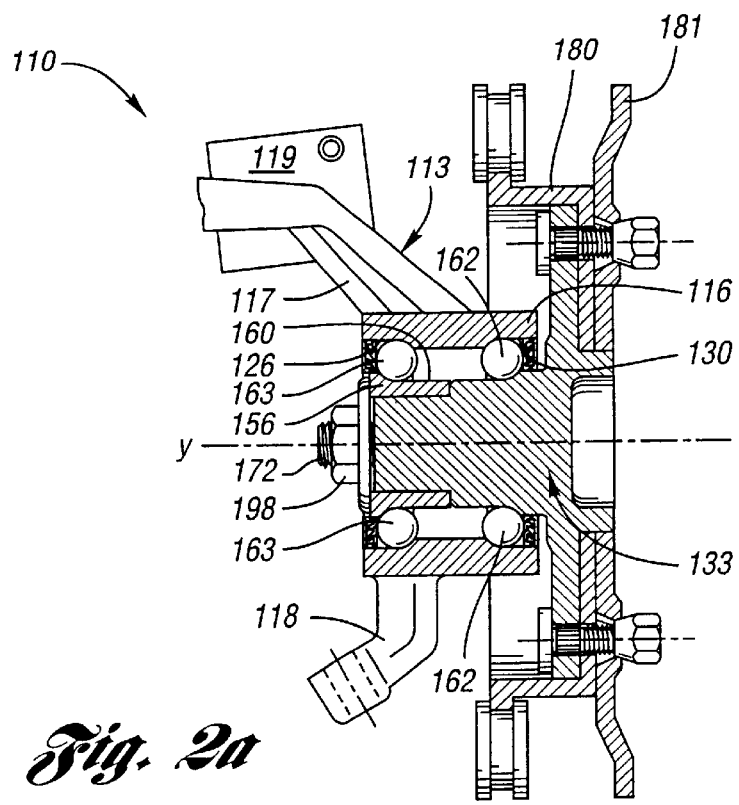
FIG. 2*a* is a cross-sectional view of a second embodiment of the bearing assembly for a non-driven wheel end of a vehicle.
Figure 2C:
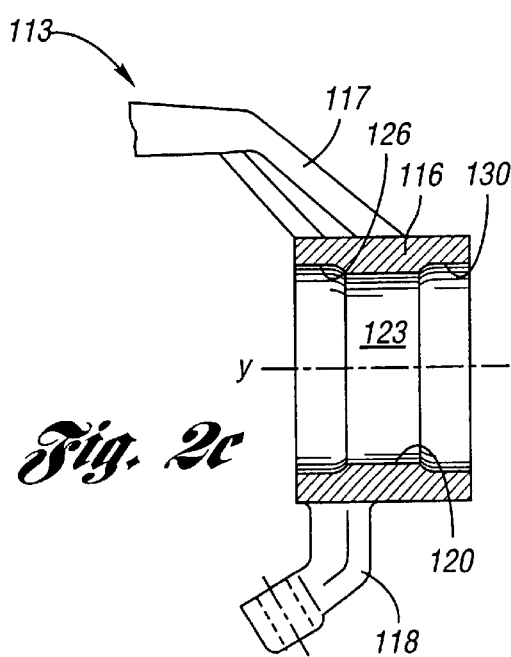
FIG. 2*c* is a cross-sectional view of a steering knuckle depicted in FIGS. 2*a* and 2*b* in accordance with the present invention.
Figure 2B:
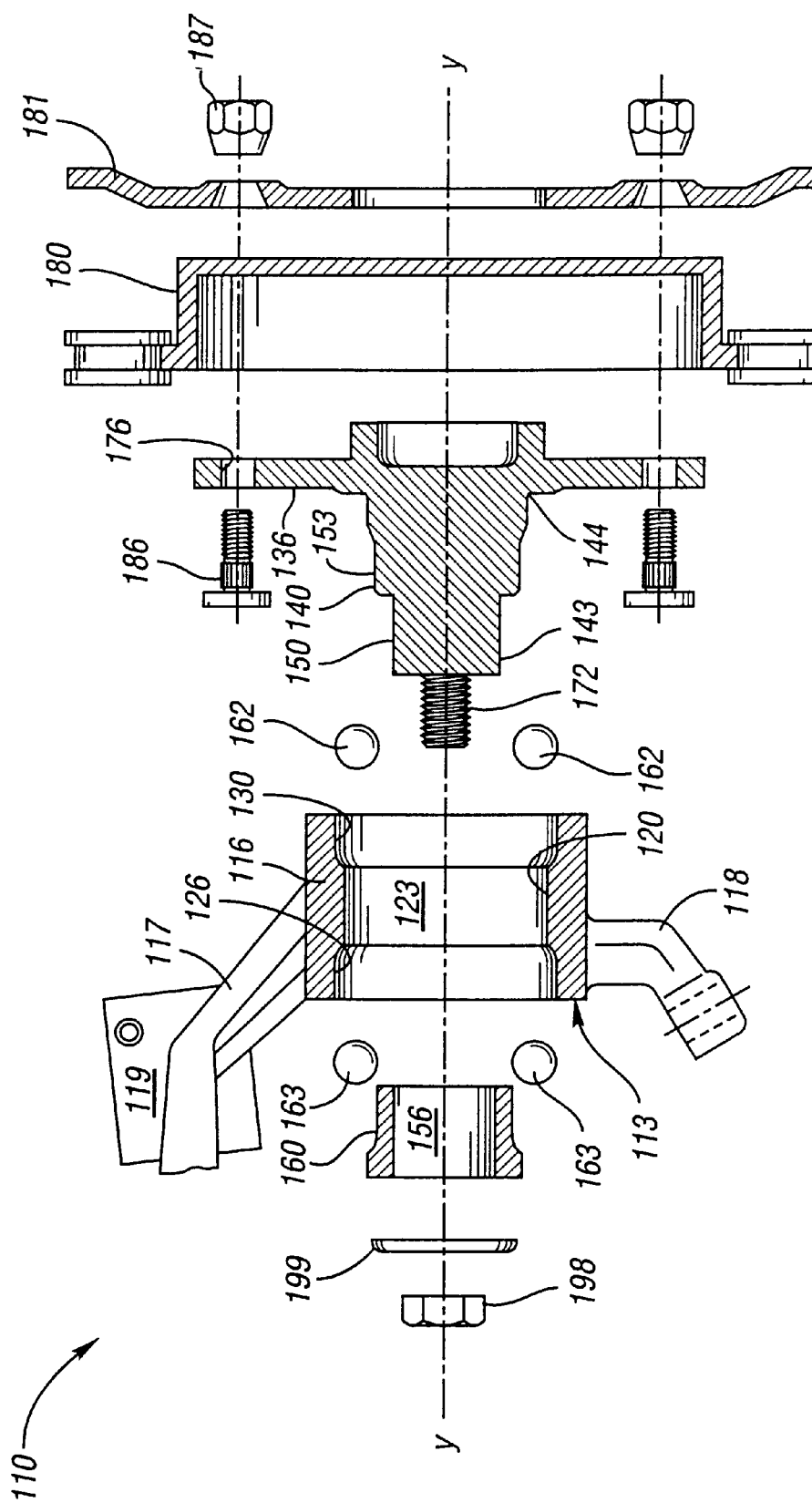
FIG. 2*b* is an exploded view of the bearing assembly in FIG. 2*a;*

FIGS. 2a–2c illustrate a second embodiment including a bearing assembly 110 which has a steering knuckle 113 for a non-driven wheel end of a motor vehicle in accordance with the present invention. As shown, steering knuckle 113 includes similar members as described in the first embodiment depicted in FIGS. 1a–1c. For example, steering knuckle 113, body 116, first and second knuckle arms 117, 118, inboard outer raceway 126, and outboard outer raceway 130 are similar to knuckle 13, body 16, first and second knuckle arms 17, 18, inboard outer raceway 26, and outboard outer raceway 30 of the first embodiment.

The second embodiment further includes hub 133 having a flange 136 and a hub shaft 140 extending from the flange 136. The hub 133 has similar components to hub 33 of the first embodiment. For example, hub 133, flange 136, hub shaft 140, inboard end 143, outboard end 144, stepped boss 150, and first raceway 153 are similar to hub 33, flange 36, hub shaft 40, inboard end 43, outboard end 44, stepped boss 50, and first raceway 53 of the first embodiment.

Bearing assembly 110 further includes inner race or ring 156 which is disposed in stepped boss 150 and has second raceway 160 formed thereon. Inner race 156 has similar components to inner race 56 of the first embodiment. Thus, second raceway 160 is formed substantially parallel to first raceway 153. The first raceway 153 is configured to cooperate with the outboard outer raceway 130 of the steering knuckle to house balls 162 therein. The second raceway 160 is configured to cooperate with the inboard outer raceway 126 of the steering knuckle to house balls 163 therein.

Hub shaft 140 further includes a threaded end 172. As shown, threaded end 172 is axially secured by center nut 198 and washer 199. Flange 136 has apertures 176 formed thereon to attach a rotor or drum 180 thereto for mounting a wheel 181 onto the bearing assembly 110. As shown, this is accomplished by mounting a plurality of wheel studs 186 and nuts 187 in apertures 176. As mentioned above, bearing assembly 110 is assembled for a non-driven wheel end to allow rotation of rotor 180 and wheel 181 about axis y.

Figure 3A:
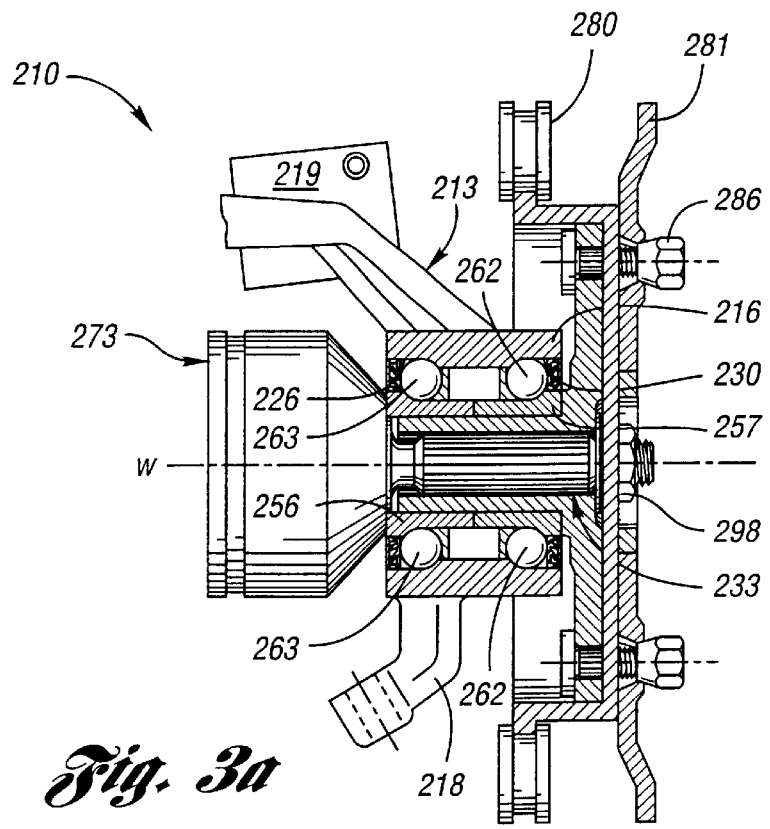
FIG. 3*a* is a cross-sectional view of a third embodiment of the bearing assembly in accordance with the present invention.
Figure 3C:
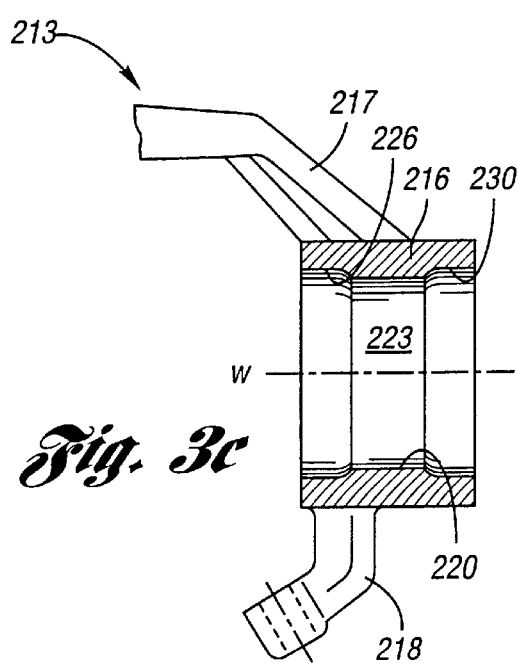
FIG. 3*c* is a cross-sectional view of a steering knuckle depicted in FIGS. 3*a* and 3*b* in accordance with the present invention.

FIGS. 3a–3c illustrate a third embodiment of a bearing assembly 210 which has a steering knuckle 213 for a driven wheel end of a motor vehicle in accordance with the present invention. As shown, steering knuckle 213 has similar components to bearing assembly 13 depicted in FIGS. 1a–1c. For example, steering knuckle 213, body 216, first and second knuckle arms 217, 218, inboard outer raceway 226, and outboard outer raceway 230 are similar to knuckle 13, body 16, first and second knuckle arms 17, 18, inboard outer raceway 26, and outboard outer raceway 30 of the first embodiment.

As shown, hub 233 includes a flange 236 and a hub shaft 240 extending from the flange 236. The hub shaft 240 has an inboard end 243 and an outboard end 244 as shown. Hub shaft 240 is to receive inner races described below, and is disposed in center bore 223 at the inboard end 243 as shown.

Hub shaft 240 further includes an internal wall 241 having an internal spline 245 and defining a center hole 270 formed therethrough for receiving a half shaft 273 as described below. Flange 236 has apertures 276 formed thereon to attach a rotor or drum 280 thereto for mounting a wheel 281 onto the bearing assembly 210. As shown, this is accomplished by mounting a plurality of wheel studs 286 and nuts 287 in apertures 276.

Half shaft 273 includes a bell 290 and a stem 292 extending therefrom. Stem 292 has an outer surface having an external spline 293 to be received in center hole 270 of hub shaft 240. As shown, stem 292 is received in center hole 270 wherein the internal wall 241 is configured to cooperate with the external spline 293 of stem 292 as known in the art to allow rotation of rotor 280 and wheel 281 about axis w. The external spline 293 is in mating relationship with internal spline 245, as known in the art. Stem 292 has a threaded end 294 so that it can be axially secured within center hole 270 by center nut 298 and washer 299.

Bearing assembly 210 further includes inboard and outboard inner races or rings 256, 257 which are disposed on outer surface of hub shaft 240. The outboard inner race 257 has a first raceway 253 formed thereon. The inboard inner race 256 has a second raceway 260 formed thereon. In this embodiment, second raceway 260 is formed on the inboard inner race 256 such that in operation the second raceway 260 is substantially parallel to the first raceway 253.

The first raceway 253 is configured to cooperate with the outboard outer raceway 230 of the steering knuckle to house balls 262 therein. The second raceway 260 is configured to cooperate with the inboard outer raceway 226 of the steering knuckle to house balls 263 therein. Outboard and inboard seals 267 and 269 are mounted at the outboard and inboard bore ends of steering knuckle 223, respectively. Outboard and inboard slingers 266 and 268 are mounted at the inner races 257 and 256, respectively. Seals 267 and 269 allow grease or lubricant to be contained within the inner races and provide protection from external contamination.

Figure 4A:
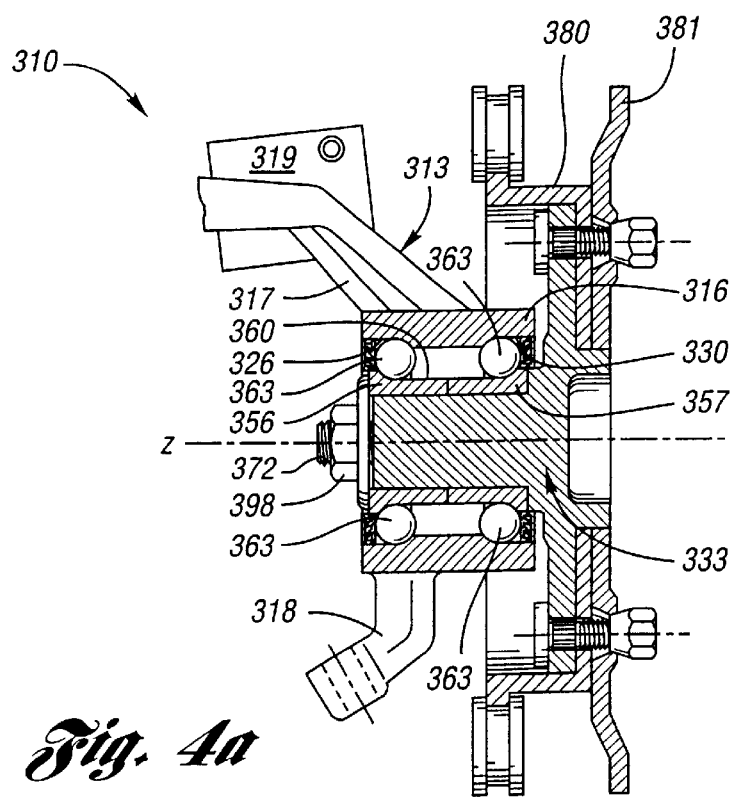
FIG. 4*a* is a cross-sectional view of a fourth embodiment of the bearing assembly for a non-driven wheel end.
Figure 4C:
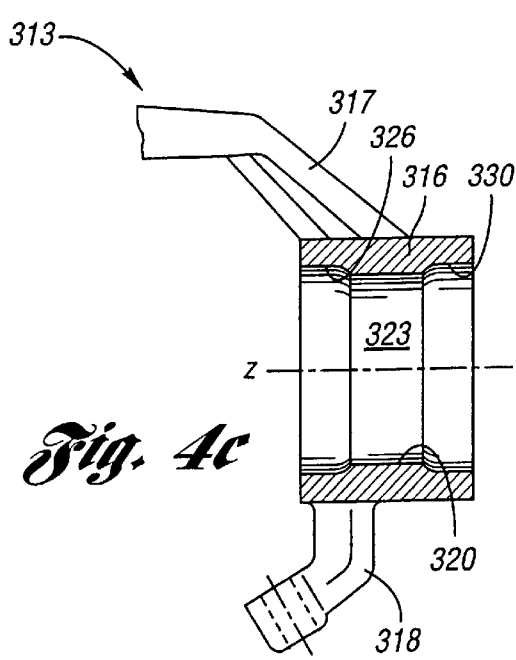
FIG. 4*c* is a cross-sectional view of a steering knuckle depicted in FIGS. 4*a* and 4*b* in accordance with the present invention.
Figure 4B:
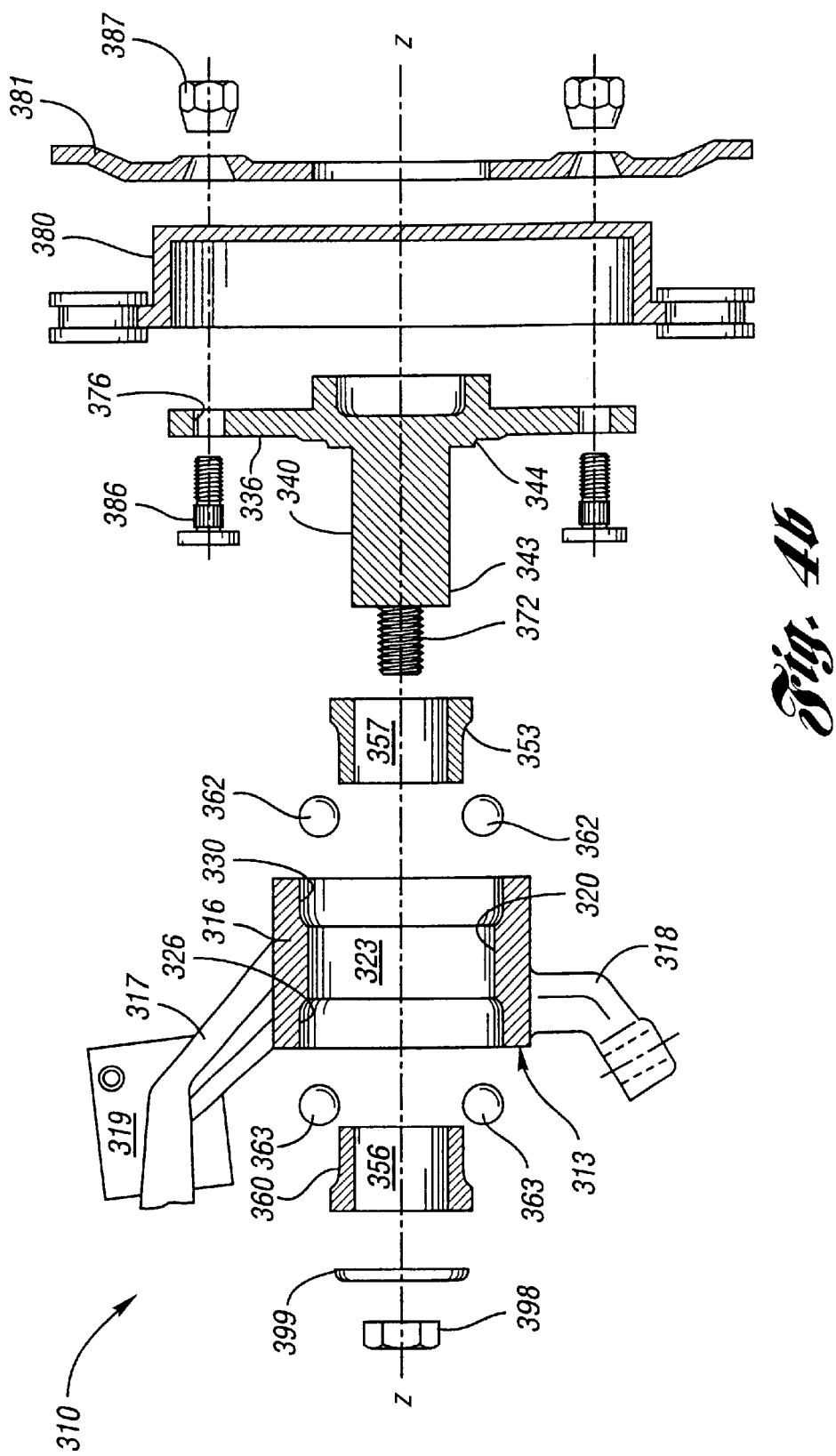
FIG. 4*b* is an exploded view of the bearing assembly in FIG. 4*a;*

FIGS. 4a–4c illustrate a fourth embodiment including a bearing assembly 310 which has a steering knuckle 313 for a non-driven wheel end of a motor vehicle in accordance with the present invention. As shown, steering knuckle 313 includes similar members as described in the third embodiment depicted in FIG. 3. For example, steering knuckle 313, body 316, first and second knuckle arms 317, 318, inboard outer raceway 326, and outboard outer raceway 330 are similar to steering knuckle 213, body 216, first and second knuckle arms 217, 218, inboard outer raceway 226, and outboard outer raceway 230 of the third embodiment.

The fourth embodiment further includes hub 333 having a flange 336 and a hub shaft 340 extending from the flange 336. The hub 333 has similar components to hub 233 of the third embodiment. For example, hub 333, flange 336, hub shaft 340, inboard end 343, outboard end 344, are similar to hub 233, flange 236, hub shaft 240, inboard end 243, and outboard end 244 of the third embodiment.

Moreover, bearing assembly 310 further includes inboard and outboard inner races or rings 356, 357 which are disposed on shaft 340. The inner races of the fourth embodiment are configured similarly with the inner races of the third embodiment. For example, the outboard inner race 357 has a first raceway 353 formed thereon, and the inboard inner race 356 has a second raceway 360 formed thereon. In this embodiment, second raceway 360 is formed on the inboard inner race 356 such that in operation the second raceway 360 is substantially parallel to the first raceway 353.

The first raceway 353 is configured to cooperate with the outboard outer raceway 330 of the steering knuckle to house balls 362 therein. The second raceway 360 is configured to cooperate with the inboard outer raceway 326 of the steering knuckle to house balls 363 therein. Outboard and inboard seals 367, 369 are mounted at the outboard and inboard bore ends of steering knuckle 323, respectively. Outboard and inboard slingers 366, 368 are mounted at the inner races 357 and 356, respectively. Seals 367, 369 allow grease or lubricant to be contained within the races and provide protection from external contamination.

Hub shaft 340 includes a threaded end 372 as described below. Flange 336 has apertures 376 formed thereon to attach a rotor or drum 380 thereto for mounting a wheel 381 onto the bearing assembly 310. As shown, this is accomplished by mounting a plurality of wheel studs 386 and nuts 387 in apertures 376. As mentioned above, bearing assembly 310 is assembled for a non-driven wheel end. Thus, hub 333 allows rotation of rotor 380 and wheel 381 about axis z. As shown, threaded end 372 axially secures shaft 340 within hole 356 by center nut 398 and washer 399. This allows rotation of rotor 380 and wheel 381.

Figure 5A:
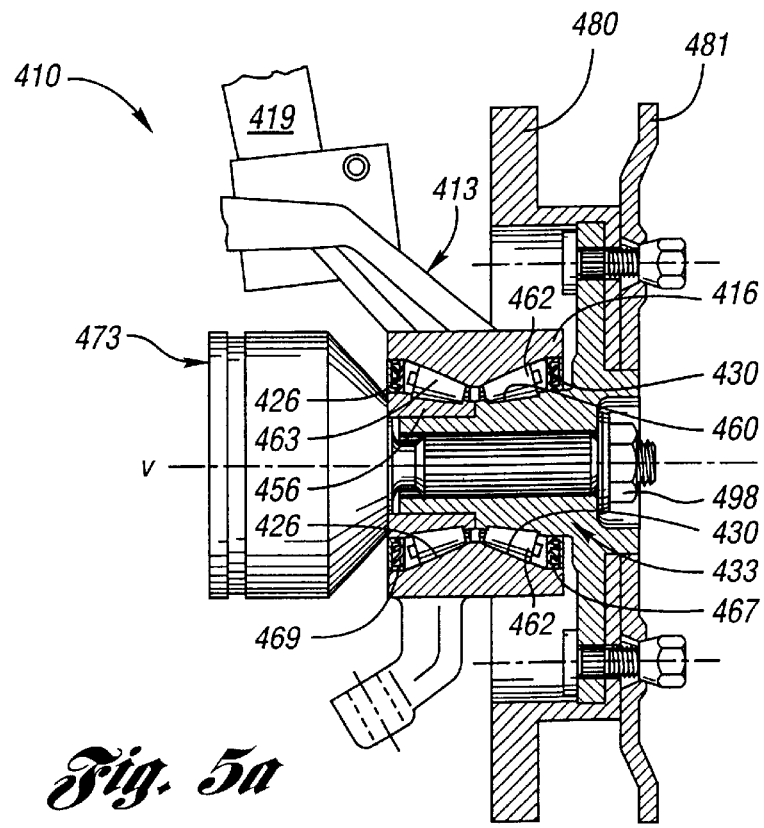
FIG. 5a is a fifth embodiment of the bearing assembly implementing tapered roller bearings housed within the bearing assembly in accordance with the present invention.
Figure 5C:
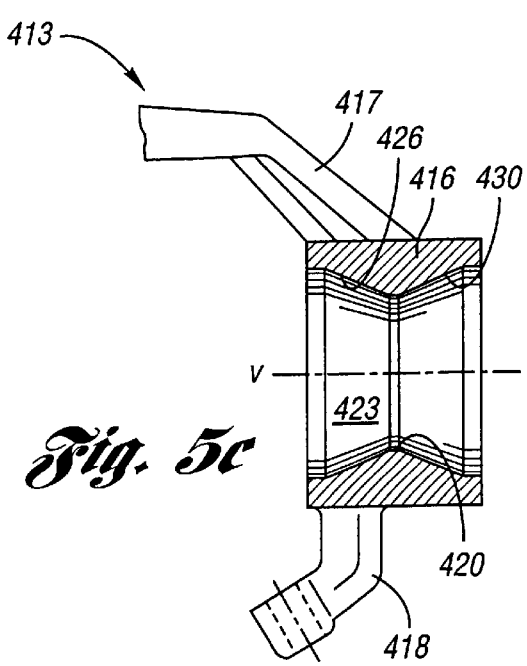
FIG. 5c is a cross-sectional view of a steering knuckle depicted in FIGS. 5a and 5b in accordance with the present invention.
Figure 5B:
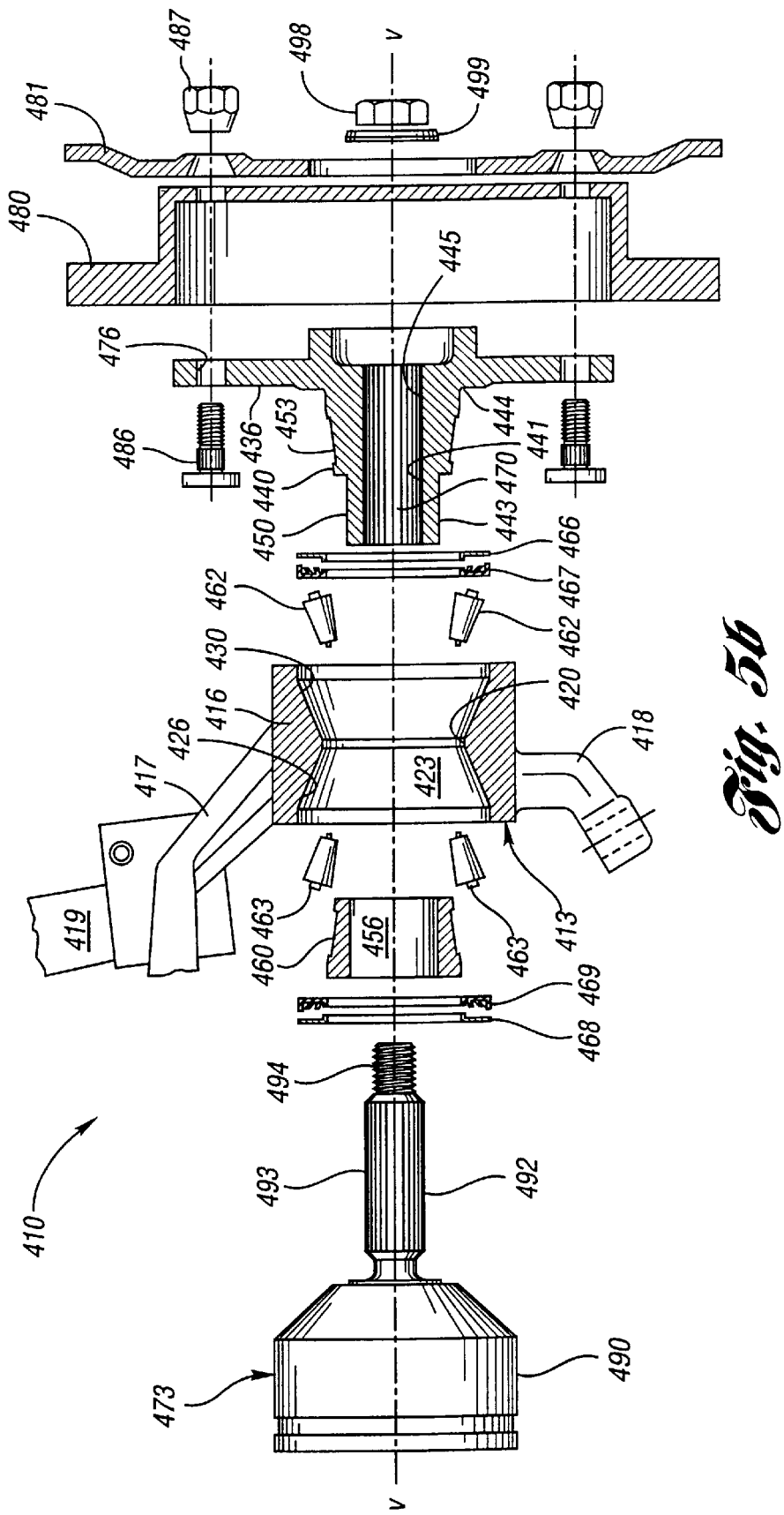

FIGS. 5a–5c illustrate a fifth embodiment of the bearing assembly in accordance with the present invention. Bearing assembly 410 includes steering knuckle 413 having body 416 and first and second knuckle arms 417, 418 extending from the body 416. The first and second knuckle arms 417, 418 are mounted to a strut 419a and a low control arm 419b, respectively, of the motor vehicle. The body 416 includes an inner wall 420 formed therethrough to define a center bore 423 of the body. In this embodiment, the inner wall 420 has an inboard outer raceway 426 and an outboard outer raceway 430 formed thereon and configured to receive tapered rollers and cages to be housed therein.

As shown, in this embodiment, inboard outer raceway 426 and outboard outer raceway 430 are obtusely formed on the inner wall 420. This allows tapered rollers having tapered surfaces to be received in raceways 426, 430. The tapered roller bearings 462, 463 have apexes which converge at a common point at a bearing axis. In this embodiment, the inboard outer raceway and the outboard outer raceway are configured to allow a back-to-back arrangement of the tapered bearing rollers. Of course, the inboard and outboard outer raceways may be configured in any other suitable manner in accordance with another desired roller arrangement, such as face-to-face arrangement. In this embodiment, a back-to-back arrangement allows the bearing assembly to withstand relatively heavy loads and shock loads. It is to be noted that inboard and outboard outer raceways may also be configured to allow any other suitable or desired roller bearing arrangement, such as single row tapered roller bearing arrangement or double row tapered roller bearing arrangement.

In this embodiment, hub shaft 440 includes a first raceway 453 formed thereon adjacent outboard end 444 of hub shaft 440. As shown, first raceway 453 is configured to receive tapered roller bearings therein and cooperate with the outboard outer raceway 430 of the steering knuckle. Bearing assembly 410 further includes inner race or ring 456 which is disposed in stepped boss 450 of hub shaft 440 and has a second raceway 460 formed thereon. As shown, second raceway 460 is configured to receive tapered roller bearings therein and to cooperate with the inboard outer raceway 426 of the steering knuckle.

Other embodiments of the bearing assembly may be implemented without falling beyond the scope or spirit of the present invention so long as the steering knuckle includes an integrated outer race having inboard and outboard outer raceways as described above. For example, other configurations of the hub, the inner race(s), the half shaft/stub shaft, and the rotor may vary so long as such variation cooperates with the inboard and outboard outer raceways of the steering knuckle.

The steel knuckle described in the embodiments above, may be made of carbon steel ranging between SAE1045 and SAE1055, and preferably SAE1050. The carbon steel mentioned above, provides adequate strength to the knuckle which now takes on the bearing loads that a separate outer race would otherwise have. It has been determined that carbon steel mentioned above are much stronger than current conventional knuckle materials, e.g., cast irons or aluminum alloys. The strength of the carbon steel may reduce the total weight and mass of the steering knuckle, reducing the total weight and size thereof and simplifying packaging requirements. Due to the elimination of an outer race, the bearing assemblies described above may allow use of larger bearings and a thicker half shaft or stub shaft. This may provide a higher bearing load-carrying capacity.

The outer races may be made in the form of a steel sleeve, insert-molded inside the knuckle body. The materials used for the remainder of the knuckle may be of any suitable material, e.g., aluminum alloy.

As mentioned in the embodiments above, the inner wall of the body replaces an outer ring or race of a conventional bearing assembly of a wheel end for a motor vehicle. An outer race would otherwise be required, creating an additional interface between the knuckle and the wheel.

What is claimed is:

1. A bearing assembly of a wheel end for a motor vehicle comprising:
    a steering knuckle including a body, having an inner wall formed therethrough to define a center bore of the body, the inner wall having an inboard outer raceway and an outboard outer raceway formed thereon; a hub including a flange and a hub shaft having inboard and outboard ends, the flange extending from the hub shaft at the outboard end, the hub shaft being disposed in the center bore of the knuckle, the hub shaft having a first raceway formed thereon adjacent the outboard end of the hub shaft, the first raceway being configured to cooperate with the outboard outer raceway of the steering knuckle to house bearings, the hub shaft having a stepped boss formed thereon adjacent the inboard end of the hub shaft; and
    an inner race disposed in the stepped boss, the inner race having a second raceway formed thereon adjacent the inboard end of the hub shaft and configured to cooperate with the inboard outer raceway of the steering knuckle to house bearings.

2. The bearing assembly of claim 1 wherein the steering knuckle includes carbon steel.

3. The bearing assembly of claim 2 wherein the carbon steel includes SAE1045, SAE1050, and SAE1055.

4. The bearing assembly of claim 1 wherein the hub includes a receiving hole formed substantially through the center of the hub shaft and the flange.

5. The bearing assembly of claim 4 further comprising:
    a rotor attachable to the flange of the hub; and
    a driven half shaft having a bell and a stem extending therefrom, the stem being received in the receiving hole of the hub, the stem cooperating with the hub to rotate the rotor.

6. The bearing assembly of claim 4 further comprising:
    a rotor attachable to the flange of the hub; and
    a non-driven shaft being received to rotate the rotor.

7. A steering knuckle of a wheel end for a motor vehicle comprising:
    a body having an inner wall formed therethrough to define a center bore of the body, the inner wall having an inboard raceway and an outboard raceway formed thereon; and
    a first and second arms extending from the body, the first arm being attachable to a suspension strut or upper control arm of the vehicle and the second arm being attachable to a low control arm of the motor vehicle.

8. A bearing assembly having a plurality of bearings of a wheel end for a motor vehicle comprising:
    a steering knuckle including a body having an inner wall formed therethrough to define a center bore of the body, the inner wall having an inboard outer raceway and an outboard outer raceway formed thereon; and
    a hub including a flange and a hub shaft having inboard and outboard ends, the flange extending from the hub shaft at the outboard end, the hub shaft being disposed in the center bore of the knuckle, the hub shaft including an outer surface thereon;
    a first inner race disposed adjacent the outboard end of the hub shaft, the first inner race having a first raceway formed thereon and configured to cooperate with the outboard outer raceway of the steering knuckle to house bearings; and
    a second inner race disposed adjacent the inboard end of the hub shaft, the second inner race having a second raceway formed thereon and configured to cooperate with the inboard outer raceway of the steering knuckle to house bearings.

9. The bearing assembly of claim 8 wherein the steering knuckle includes carbon steel.

10. The bearing assembly of claim 9 wherein the carbon steel includes SAE1045, SAE1050, and SAE1055.

11. The bearing assembly of claim 8 wherein the hub includes a receiving hole formed substantially through the center of the hub shaft and the flange.

12. The bearing assembly of claim 11 further comprising:
    a rotor attachable to the flange of the hub; and
    a driven half shaft having a bell and a stem extending therefrom, the stem being received in the receiving hole of the hub and cooperating with the hub to rotate the rotor.

13. The bearing assembly of claim 4 further comprising:
    a rotor attachable to the flange of the hub; and
    a non-driven shaft being to rotate the rotor.

14. The bearing assembly of claim 1 wherein the inboard outer raceway and the outboard outer raceway are configured to receive ball bearings thereon.

15. The bearing assembly of claim 14 wherein the first and second raceways are configured to receive ball bearings thereon, the first raceway cooperating with the outboard outer raceway to house ball bearings therein and the second raceway cooperating with the inboard outer raceway to house ball bearings therein.

16. The bearing assembly of claim 1 wherein the inboard and outboard outer raceways are configured to receive tapered roller bearings thereon.

17. The bearing assembly of claim 16 wherein the first and second raceways are configured to receive tapered roller bearings thereon, the first raceway cooperating with the outboard outer raceway to house tapered roller bearings therein, the second raceway cooperating with the inboard outer raceway to house tapered roller bearings therein.

18. The bearing assembly of claim 8 wherein the inboard and outboard outer raceways are configured to receive ball bearings thereon.

19. The bearing assembly of claim 18 wherein the first and second raceways are configured to receive ball bearings thereon, the first raceway cooperating with the outboard outer raceway to house ball bearings therein, the second raceway cooperating with the inboard outer raceway to house ball bearings therein.

20. The bearing assembly of claim 8 wherein the inboard and outboard outer raceways are configured to receive tapered roller bearings thereon.

21. The bearing assembly of claim 20 wherein the first and second raceways are configured to receive tapered roller bearings thereon, the first raceway cooperating with the outboard outer raceway to house tapered roller bearings therein, the second raceway cooperating with the inboard outer raceway to house tapered roller bearings therein.

\* \* \* \* \*